(12) United States Patent
Veshchikov

(10) Patent No.: US 12,197,558 B2
(45) Date of Patent: Jan. 14, 2025

(54) METHOD FOR AUTHENTICATING AN ELECTRONIC DEVICE

(71) Applicant: NXP B.V., Eindhoven (NL)

(72) Inventor: Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 245 days.

(21) Appl. No.: 17/662,507

(22) Filed: May 9, 2022

(65) Prior Publication Data

US 2023/0359724 A1 Nov. 9, 2023

(51) Int. Cl.
| G06F 21/00 | (2013.01) |
| G06F 11/10 | (2006.01) |
| G06F 21/44 | (2013.01) |
| H04L 9/12 | (2006.01) |
| H04L 9/40 | (2022.01) |
| H04L 29/06 | (2006.01) |

(52) U.S. Cl.
CPC .......... *G06F 21/44* (2013.01); *G06F 11/1044* (2013.01); *H04L 9/12* (2013.01); *H04L 63/0853* (2013.01)

(58) Field of Classification Search
CPC ........ G06F 11/1044; G06F 21/44; H04L 9/12; H04L 63/0853
See application file for complete search history.

(56) References Cited

U.S. PATENT DOCUMENTS

| 7,750,793 B2 | 7/2010 | Juels |
| 8,407,552 B2 | 3/2013 | Rigaudeau et al. |
| 8,458,551 B2 | 6/2013 | Owaki et al. |
| 8,930,709 B2 | 1/2015 | Navratil et al. |
| 9,496,897 B1 | 11/2016 | Triandopoulos et al. |
| 9,747,734 B2 | 8/2017 | Chaar et al. |
| 2006/0294390 A1 | 12/2006 | Navratil et al. |

(Continued)

FOREIGN PATENT DOCUMENTS

| CN | 107633410 B | 2/2021 |
| EP | 1554835 B1 | 12/2006 |

(Continued)

OTHER PUBLICATIONS

C Forum; Never understood how C64 copy protection worked!? Commodore 64(C64) Forum Index; Dec. 2, 2016; https://www.lemon64.com/forum/viewtopic.php?t=62695&sid=2b9fbde42d72b6331ca53c4752304f02.

(Continued)

*Primary Examiner* — Rodman Alexander Mahmoudi

(57) ABSTRACT

A method is provided for authenticating an electronic device. The method includes obtaining a message to be sent. A plurality of error locations is determined for errors to be intentionally introduced into the message. The plurality of error locations is communicated to a verifier device. A bit at each of the error locations of the plurality of error locations is inverted in the message in the electronic device to generate a message with intentionally introduced errors. The plurality of error locations is sent to a verifier device. The message with the intentionally introduced errors is transmitted to the verifier device. The verifier device is enabled to use the plurality of error locations to authenticate the electronic device by comparing errors detected in the transmitted message to the plurality of error locations. The method provides a way to detect a clone of the electronic device.

19 Claims, 7 Drawing Sheets

(56) References Cited

U.S. PATENT DOCUMENTS

| | | | | |
|---|---|---|---|---|
| 2007/0140259 A1* | 6/2007 | Mouffron | ............... | H04L 1/0061 |
| | | | | 370/395.32 |
| 2013/0325820 A1* | 12/2013 | Grube | ................. | G06F 11/0727 |
| | | | | 707/691 |
| 2014/0214675 A1* | 7/2014 | Sharma | .................. | G06Q 20/10 |
| | | | | 705/44 |
| 2014/0340347 A1* | 11/2014 | Tenuta | ................. | G06F 3/04162 |
| | | | | 345/174 |
| 2021/0326432 A1* | 10/2021 | Kaidi | .................... | H04L 9/3226 |

FOREIGN PATENT DOCUMENTS

| | | | |
|---|---|---|---|
| JP | 2010530990 A | | 9/2010 |
| JP | 2016076905 A | * | 5/2016 |

OTHER PUBLICATIONS

Anderson, Howard C.; Apple II Disk Copy Protection; https://astroshow.com/papers/TechnicalPapers.html?msclkid=46d9be23cfaa11ec9d65a16e4f19e5a0; Copyright 2011.

* cited by examiner

METHOD FOR AUTHENTICATING AN ELECTRONIC DEVICE

BACKGROUND

Field

This disclosure generally relates to electronics, and more particularly, to a method for authenticating an electronic device.

Related Art

Many modern products have replaceable parts or consumables that are often copied by competitors. The competitor might copy a product and then sell cheaper versions of it. In some cases, the vendor or manufacturer of the original product is the only one suffering losses. In some cases, the consumer might also suffer from issues with a poorly designed or manufactured clone. For example, a poorly made clone may cause damage to other devices that interact with the poorly made clone. Examples of products that are often copied are compact discs (CD) and a type of CD referred to as DVDs, printer cartridges, near field communication (NFC) smartcards and many other devices that incorporate SoCs (Systems-on-Chip).

Devices that are being copied often already have some copy protection, tamper resistance features, and anti-cloning countermeasures. However, these devices are still copied by attackers. In some cases, an attacker only needs to copy a secret value (such as a cryptographic key) to be able to copy the device and bypass its authentication mechanisms. In such cases the attacker might even buy the same hardware (HW) from the same HW manufacturer, e.g., an SoC from a semiconductor manufacturer that is the original vendor of the targeted device for cloning. The attacker might simply provision the HW with the extracted cryptographic material to be able to bypass the authentication.

Therefore, what is needed is a secondary way of authenticating a device that can be used while a traditional cryptographic authentication is ongoing.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
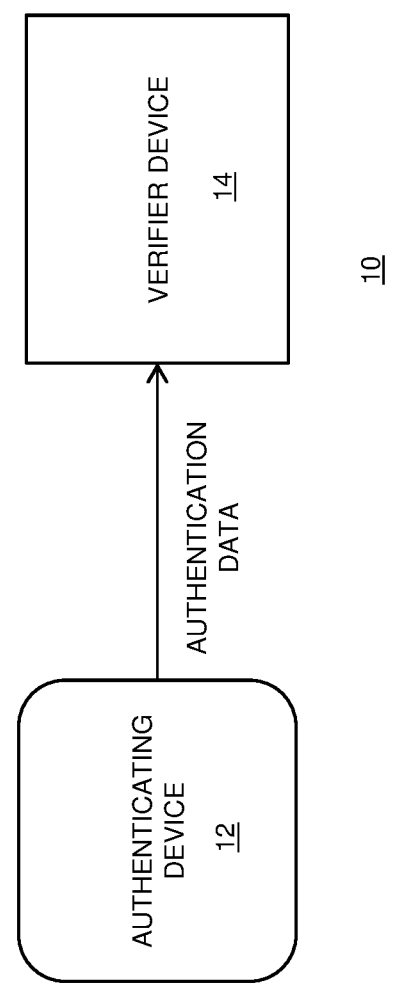
FIG. 1 illustrates an authenticating device and a verifying device in accordance with an example embodiment.

Generally, there is provided, a method for authenticating a device that uses the intentional introduction of "errors" in messages exchanged between devices. The errors are introduced in one or more messages by an authenticating device, or device being authenticated. A manufacturer of verifier devices and of the authenticating devices will provision a shared key and the same algorithm for generating error locations into both types of devices In one embodiment, the devices use error-detection or error correction codes to detect the introduced errors and/or ensure correctness of received messages prior to checking the locations of the introduced errors. The method for authenticating may be used as an additional clone detection mechanism for many types of devices that send messages or exchange data with other devices. The messages may be sent only in one direction between devices, or in both directions. Example devices include smart-cards and readers, a disk with a game or gaming console, and an ink cartridge and a printer.

In accordance with an embodiment, there is provided, a method for authenticating an electronic device, the method Including: obtaining a message to be sent; determining a plurality of error locations for errors to be intentionally introduced into the message, wherein a bit is inverted at each of the error locations of the plurality of error locations in the message to generate a message with intentionally introduced errors; sending the plurality of error locations to a verifier device or enabling the verifier device to generate the plurality of error locations; and transmitting the message with the intentionally introduced errors to the verifier device, wherein the verifier device is enabled to use the plurality of error locations to authenticate the electronic device by comparing errors detected in the transmitted message to the plurality of error locations. The method may further include computing a checksum for the message using an error detecting code. The method may further include computing a checksum for the message using an error correcting code. The intentionally introduced errors may be removed using the error correcting code. Determining the plurality of error locations may further include determining the plurality of error locations using a secret key as a seed for a pseudo-random number generator to randomly determine the plurality of error locations. The plurality of error locations may be compiled into a list and stored in memory of the electronic device and the verifier device. The plurality of error locations may be generated in the electronic device using a device identifier and a special function, and wherein the verifier device is enabled to generate the plurality of error locations using the device identifier and the special function. Determining a location of the plurality of error locations may include determining if the location is in a forbidden zone of the message, wherein if the location is in a forbidden zone, discarding the location. The plurality of error locations may be changed every time the electronic device is authenticated. The electronic device is one of a smartcard, a CD, a DVD, or a printer cartridge.

In another embodiment, there is provided, a method for authenticating an electronic device by a verifier device, the method including: receiving a message from the electronic device; determining that the message includes errors; extracting a list of error locations of a plurality of intentionally introduced errors; inverting a bit in the message at each location of the list of error locations to produce a modified message; detecting if the modified message includes errors, and determining if the detected errors match the list of error locations, wherein the list of error locations and detected errors are used to authenticate the electronic device. Determining that the message includes errors may further include using an error detecting code (EDC) to determine that the message includes errors. Extracting the list of locations may further include generating the list of locations using a device identifier and a special function. Extracting the list of error locations may further include retrieving the list of error locations from a memory in the verifier device. The verifier device may include one of a smartcard reader, a smart phone, a CD/DVD player, or a printer.

In yet another embodiment, there is provided, a method for authenticating an electronic device, the method including: receiving a message from the electronic device in a verifier device; checking the message for errors using error correction code (ECC); detecting errors in the message; attempting to correct the errors in the message using the ECC; extracting a list of intentionally introduced error locations; counting the errors that were corrected and were on the extracted list of intentionally introduced errors to produce an error count; and determining that the electronic device is genuine if the error count is above a predetermined threshold. The ECC may include one or more of a Hamming code, extended Hamming code, or Reed-Solomon code. The method may further include receiving the extracted list of intentionally introduced error locations by the verifier device from the electronic device. The list of intentionally introduced error locations may be recreated in the verifier device using a device identifier and a special function. The list of intentionally introduced error locations is retrieved from a memory in the verifier device.

FIG. 1 illustrates authenticating device 12 and verifier device 14 in accordance with an example embodiment. Authenticating device 12 and verifier device 14 already use a cryptographic authentication protocol. In one embodiment, authentication data is sent from authenticating device 12 to verifier device 14 according to the authentication protocol. There are a number of authentication protocol available. Many authentication protocols have multiple message exchanges between the authenticated device and the verifier device. In one embodiment, the authenticating device may be a smartcard and the verifier device may be a near field communication (NFC) reader. In another embodiment, different types of devices may be used, such as for example, ultra-wideband (UWB) devices, ethernet transceivers, various devices using Bluetooth protocols, etc. As described herein, an additional authentication mechanism is added to the existing authentication protocol. The additional authentication mechanism introduces intentional errors into a message that is to be sent from authenticating device 12 to verifier device 14. The errors are introduced in specific locations known by both devices. The presence of errors can be checked through the use of an error correcting or error detection mechanisms. If errors are present in specific locations (known in advance by the verifier) in the message, then the verifier has additional information confirming that the authenticated device is genuine. The techniques described herein can be implemented using a variety of different parameters and devices.

Error detecting codes (EDC) and error correcting codes (ECC) are used in many communication protocols to detect, and in the case of ECC, to correct transmission errors. In general, EDC and ECC add some redundancy to a message before sending it. The redundancy is used to detect and sometimes correct an error. The redundant part that is added to a message may be called a checksum. The objective of EDC is to check if the message is received without errors. If errors are detected, then a receiving device can ask a transmitting device to send the message one more time. In the case of ECC, some transmission errors can be immediately corrected. If too many errors occurred and cannot be corrected by ECC, then the errors are often at least detected. The receiving device may ask the transmitting device to send the message again. In practice, sometimes the receiving device does not ask the sending device to send a message one more time. Instead, the receiving device may send a special "all OK" message when there were no problems with the message. Therefore, if the special "all OK" message does not arrive, it's a signal for a sender to send the message again. An example of this case is the transmission control protocol (TCP). There are many types of EDCs as well as ECCs. For example, Hamming code, Extended Hamming code, and Reed-Solomon are ECCs. Examples of EDCs are cyclic redundancy check (CRC) and parity code. Any hash function, such as for example, SHA256, SHA3, MD5 can play a role of a checksum for the error detection.

Figure 2:
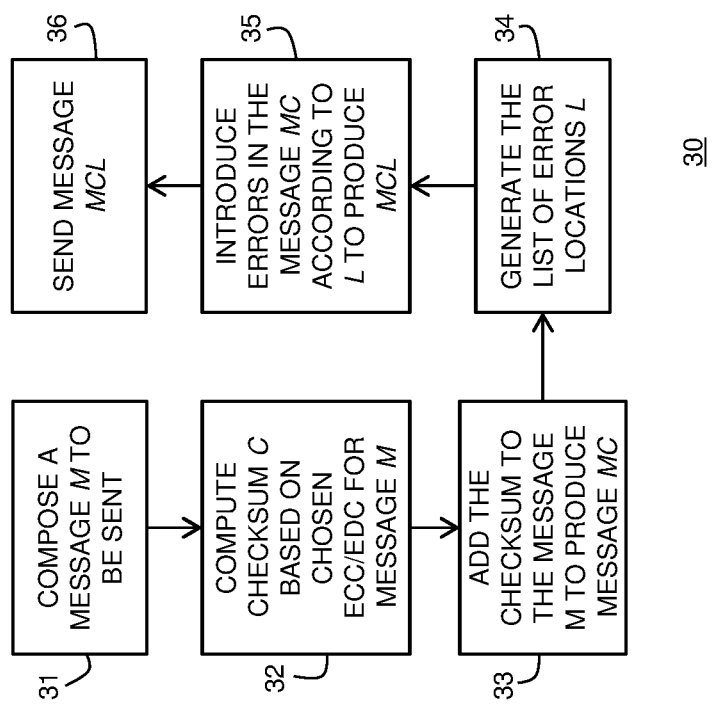
FIG. 2 illustrates a method for composing a message in accordance with an embodiment.

FIG. 2 illustrates method 30 for composing a message with intentional errors in accordance with an embodiment. To use method 30, the verifier such as a card reader and the authenticating entity such as a smartcard have to agree in advance on the location of the errors in the message. The location of errors can be fixed for a given device or the location can change depending on the date, time, times when the device is authenticated, or according to some other rule. For example, the authenticating device and the verifier device can share a special key which will be used as a seed for a pseudo-random number generator (PRNG) that will be used to generate locations of the errors that will be embedded in the message. As an example, assume that 5 locations for 5 errors in a message having 100 bytes are chosen as shown in Table 1 below. In Table 1 below, one error is located at the second bit in the fifth byte of the message. Another error is located at the fourth bit in the $38^{th}$ byte of the message, and so on. Other lists of error locations can have a different number of error locations.

TABLE 1

| | Byte number | | | | |
|---|---|---|---|---|---|
| | 5 | 38 | 43 | 67 | 88 |
| Bit in the byte | 2 | 4 | 1 | 5 | 6 |

Method 30 begins at step 31 and is performed by the authenticating device. In another embodiment, a different device may perform the method. At step 31, a message M is generated or obtained by the authenticating device. At step 32, a checksum C is computed based on an ECC or EDC algorithm for message M. In the case of EDCs, it may be necessary to avoid the introduction of errors in certain specific locations of message M, for example, the location of a device identifier (ID) of the sending device. At step 33, a checksum C is added to message M to produce message MC. At step 34, a list of error locations L is generated for message MC. The list of locations L may be generated based on a shared key, current time and/or date, the contents of message MC, a device ID of the sending device, or a combination of the above values. At step 35, errors are introduced in message MC according to the list of locations L to produce MCL. The errors may be introduced by inverting the bits at the list of error locations (see Table 1 above). The list may be a table saved in memory or the list may be recreated by using a predetermined function. In one embodiment, the list may be created using a random number generator and the device ID as a seed. At step 36, the message, as modified with the intentionally introduced errors, is sent to a verifier device.

Figure 3:
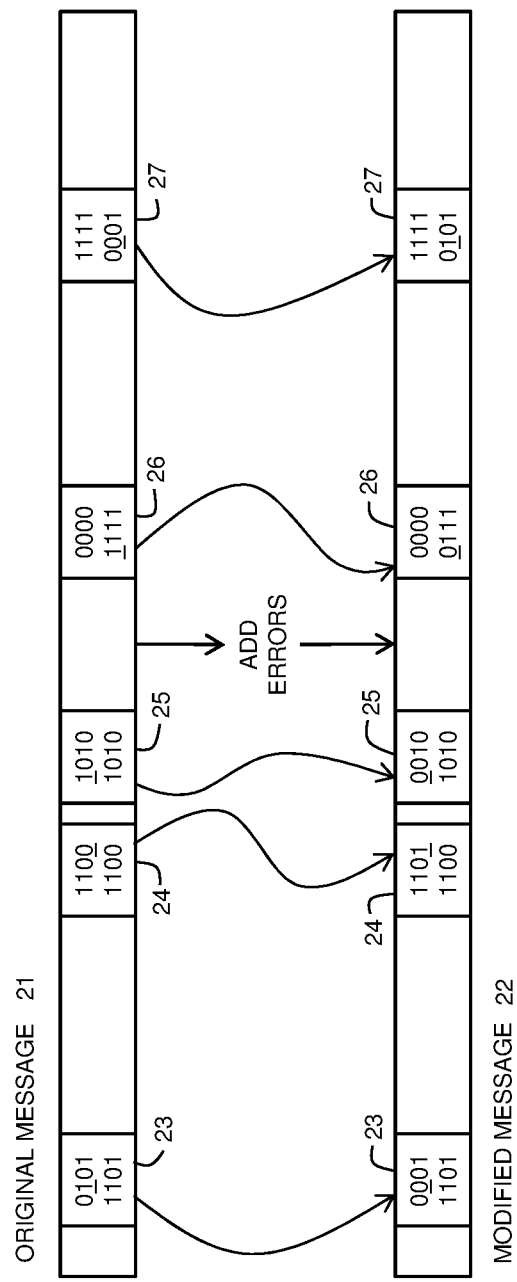
FIG. 3 illustrates an original message and the original message modified with errors in accordance with an embodiment.

FIG. 3 illustrates an original message 21 and the original message modified with intentional errors to produce modified message 22 in accordance with an embodiment. For this example, message 21 includes 100 bytes. In one embodiment, message 21 will include a checksum (not shown) produced by running EDC or ECC. EDC and ECC are commonly used by many communication protocols to check for transmission errors and to potentially correct them. As can be seen in FIG. 3, the illustrated example includes 5 error locations 23-27. The error locations and errors are the same as shown in Table 1. In another embodiment, the number of locations and the number of bits in a location of intentionally introduced errors can be different depending on the application, protocol, type of device and security needs.

Once the authenticating device composes the message to be sent to the verifier device, the authenticating device will access or create the list of error locations and invert (change from 0 to 1 and from 1 to 0) the bits that are in the list of error locations as discussed above and shown in Table 1. By way of example, original message 21 includes locations 23-27 which correspond from left to right with the locations shown in Table 1. As can be seen, each location includes a byte with example bit values. In another embodiment, the location may include any number of bits or bytes. Note that the error locations should be chosen so that they are detectable and can be corrected by the verifier device. This may depend, at least partly, on the type of ECC used. In the example of FIG. 3, in original message 21, location 23 includes bit values 01011101, and the second bit is chosen to include an error as shown in Table 1. Therefore, location 23 is modified in message 22 to include values 00011101. Note that the bits being changed are underlined. Likewise, the byte at location 24 is changed from bit values 11001100 to bit values 11011100, the byte at location 25 is changed from bit values 10101010 to 00101010, the byte at location 26 is changed from 00001111 to 00000111, and the byte at location 27 is changed from 11110001 to 11110101. In this example, the ECC is capable of detecting and correcting at least a single error in any location of any byte of the message. However, some error detecting codes will not work for the described example. For example, if a parity bit error detection scheme was used, the bits could not be altered for an even number of bits, otherwise the parity is conserved, and the error will not be detected. That is, a simple parity bit technique is to add one bit (0 or 1) in such way that the total number of bits in the message equal to 1 is odd, e.g., if the original message is "010" then the parity bit will be 0 and the new message will be "0100".

Figure 4:
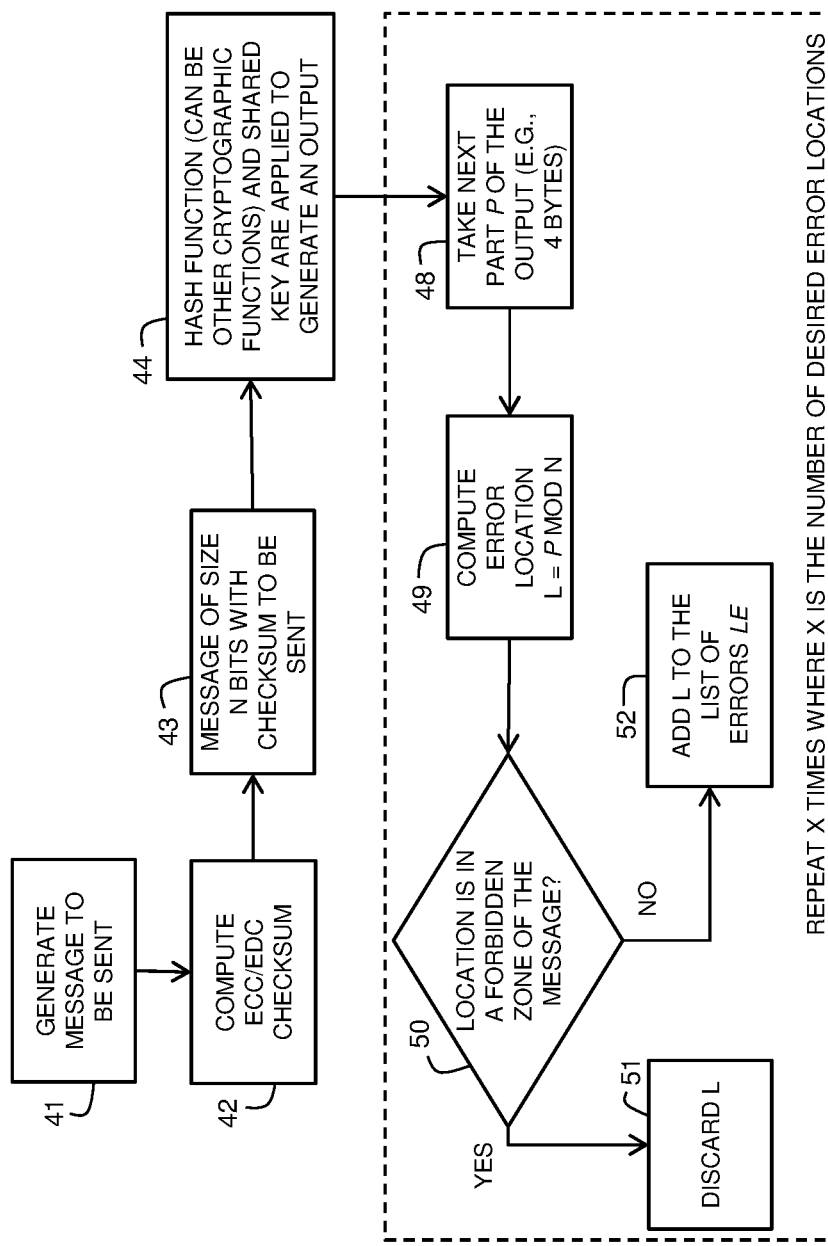
FIG. 4 illustrates a method for composing a message in accordance with an another embodiment.

FIG. 4 illustrates method 40 for composing a message with intentional errors in accordance with an another embodiment. Method 40 is another method a sender (authenticating device) may use to compose a message with intentional errors before sending the message to a verifier device. Like method 30 illustrated in FIG. 2, the verifier device such as a card reader and the authenticating entity such as a smartcard have to agree in advance on the location of the errors in the message. As described above, a fixed list can be used that is shared between all devices in the system or between each pair of devices. Also, in another embodiment, a list of error locations can be generated based on a device ID and an algorithm or function that would always produce the same result. Using this approach, a verifier device, such as a card reader, would only have to store one algorithm for the generation of error locations. The verifier device would generate a unique list for each new authenticating device, such as a smartcard, that interacts with the reader, using, e.g., a device ID. The list of error locations may be provided as described above and shown in Table 1.

Method 40 begins at step 41. At step 41, a message M is generated or otherwise obtained. At step 42, a checksum is computed based on an ECC or EDC algorithm for the message obtained in step 41. At step 43, the checksum is added to the message generated in step 41. At step 44, a hash function or another function that can be used to generate a stream of data based on a small input, and a shared key are applied to the message from step 43 to generate an output. The shared key may include a device ID. The output can be the complete output (sometimes called the long output) or a portion of the long output. At step 48, the output is divided into parts P and one part is selected. A part P can be any size, e.g., 4 bytes. The size of a part may be determined by the number of bits in the message and by how many errors are desired to be inserted in the message. At step 49, an error location L is computed for the part P, where L=P mod N, where N is equal to the number of bits in the message. At decision step 50, it is determined if the location L is in a forbidden zone or bit field of the message where the bit values cannot be changed. Also, in the case of some messages and devices, putting errors in some parts of a message should be avoided, such as the device ID. Also, including too many errors too close to each other can damage the EDC functionality. If the location L is in the forbidden zone, such as a zone including the device ID, then the location L is discarded at step 51. If the location is not in the forbidden zone of the message, then the NO path is taken to step 52. At step 52, the location L is added to the list of error locations. The steps 48 through 52 (enclosed by the dashed rectangle) are repeated for each part P of the message until locations L for all parts P of the message have been determined. In another embodiment, instead of computing the list for each message, steps 48-52 can be replaced by precomputing a list of error locations and storing the list in a memory as a lookup table (LUT)

Once the message is sent by the authenticating device, the verifier device receives the message and can start the verification or authentication process on a message that includes the intentionally added errors. Several possible scenarios can happen in the verifier device: (1) errors in addition to the expected errors are detected but cannot be corrected because there were some additional transmission errors and thus, the verifier device can ask the authenticating device to repeat the message; (2) all expected errors were detected and no other errors were detected, meaning that the authenticating device is likely genuine; (3) all expected errors were detected and some additional errors were detected, meaning that the authenticating device is genuine and some additional transmission errors occurred; (4) most of the expected errors were detected, meaning that the authenticating device is likely genuine and some transmission errors may have occurred in the same general locations where intentional errors were introduced i.e., some transmission errors effectively corrected the intentional errors in the message; and (5) none or very few errors of the list of intentional error locations were detected, meaning that the device is likely not a genuine device.

It is always possible that real, non-malicious errors are introduced during the message transmission due to the noise. Thus, there might be additional errors in the received message and some of the transmission errors might by chance occur in the same positions that are used in the error locations list for authentication. Therefore, the verifier device may only detect some errors from the list of error locations that was generated by the authenticating device. In one embodiment, to overcome this limitation, the verifier device may have a threshold value of errors detected that are on the list of error locations. If the number of errors that occurred at expected locations is greater than the threshold value for the number of errors from the list of expected error locations, then the authentication succeeded. In one example, the threshold value may be, e.g., 4 for a list of 5 total expected errors. That is, if at least 4 of the expected errors are detected, then we can consider that the authenticating device is genuine.

Figure 5:
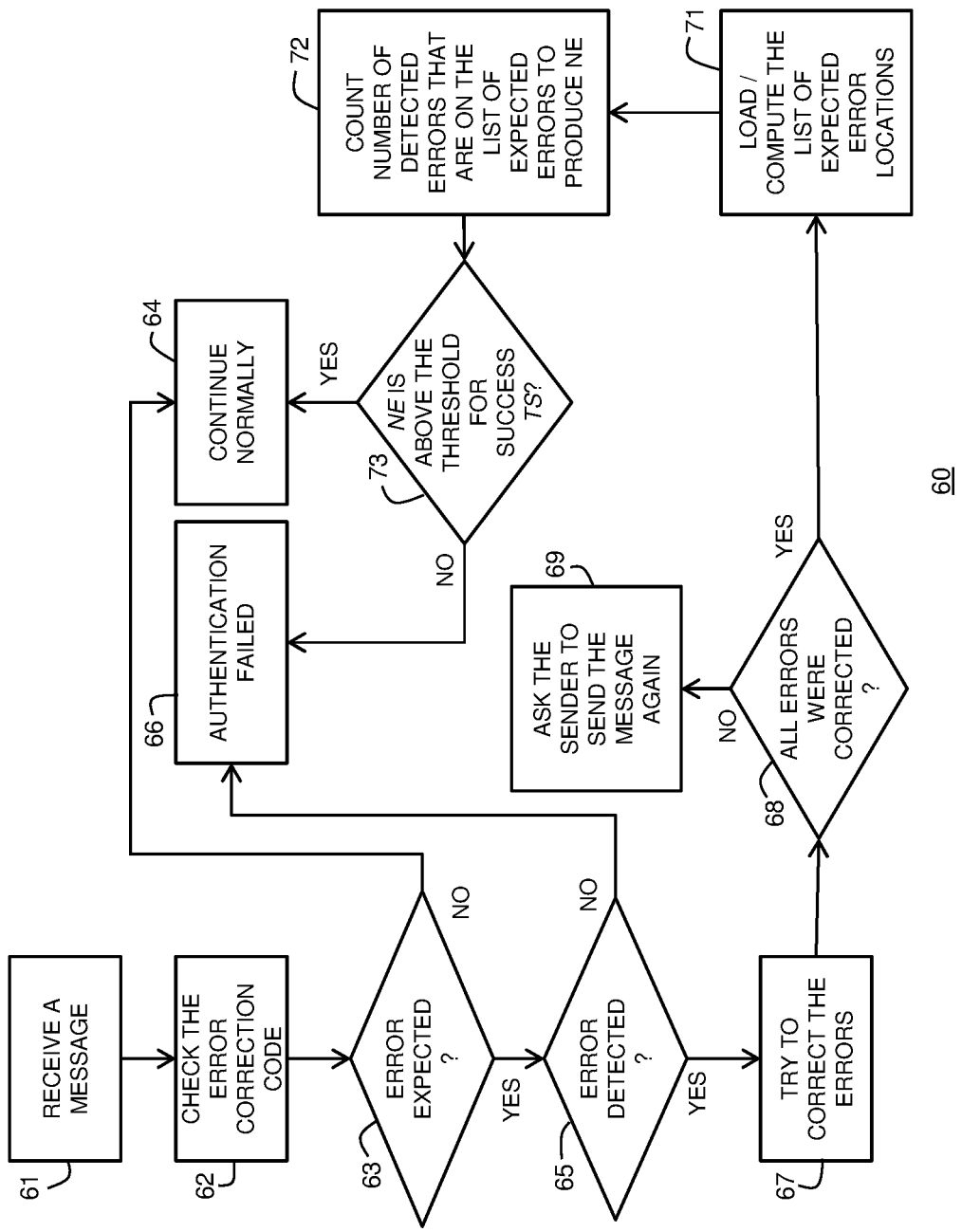
FIG. 5 illustrates a method for authenticating a message by a device with error correction code in accordance with an embodiment.

FIG. 5 illustrates method 60 for authenticating a message received from an authenticating device in accordance with an embodiment. The steps of method 60 may be followed by a verifier device (e.g., a card reader) with ECC. Method 60 begins at step 61. At step 61 a message is received from an authenticating device (e.g., a smartcard). The message may have been transmitted wirelessly (such as NFC, Bluetooth, or Wifi) or with a wired protocol such as ethernet. At step 62 the verifier runs its ECC on the message. At decision step 63 if no errors are expected, then the method follows the NO path to step 64 where processing of the message continues normally. If errors are expected, then the YES path is taken to decision step 65. At decision step 65 if no errors are detected, then NO path is taken to step 66 where the authentication failed because missing expected errors may indicate the message was sent by a clone device. If, at step 65, one or more errors are detected, the YES path is taken to step 67. At step 67 the verifier device attempts to correct the detected errors using ECC. At decision step 68 it is determined if all the errors were corrected. If not, then the NO path is taken to step 69. At step 69 the verifier device requests the message be resent. If, however, all the errors were corrected, the YES path is taken to step 71. At step 71 a list of error locations is computed or retrieved as discussed above and intentionally applied to the message so that message includes errors. At step 72 a number of errors NE detected and corrected using the ECC that are on to the list of errors is compared with a predetermined threshold. At decision step 73 it is determined if the number of errors NE is above the predetermined threshold as discussed above. If the number of errors NE is not above the threshold, then the NO path is taken to step 66, and the authentication fails. The authentication may have failed because the device that sent the message is a clone. If the number of errors NE is above the threshold, then the YES path is taken to step 64. At step 64 it is determined that the device that sent the message is successfully authenticated, and processing can continue normally.

Figure 6:
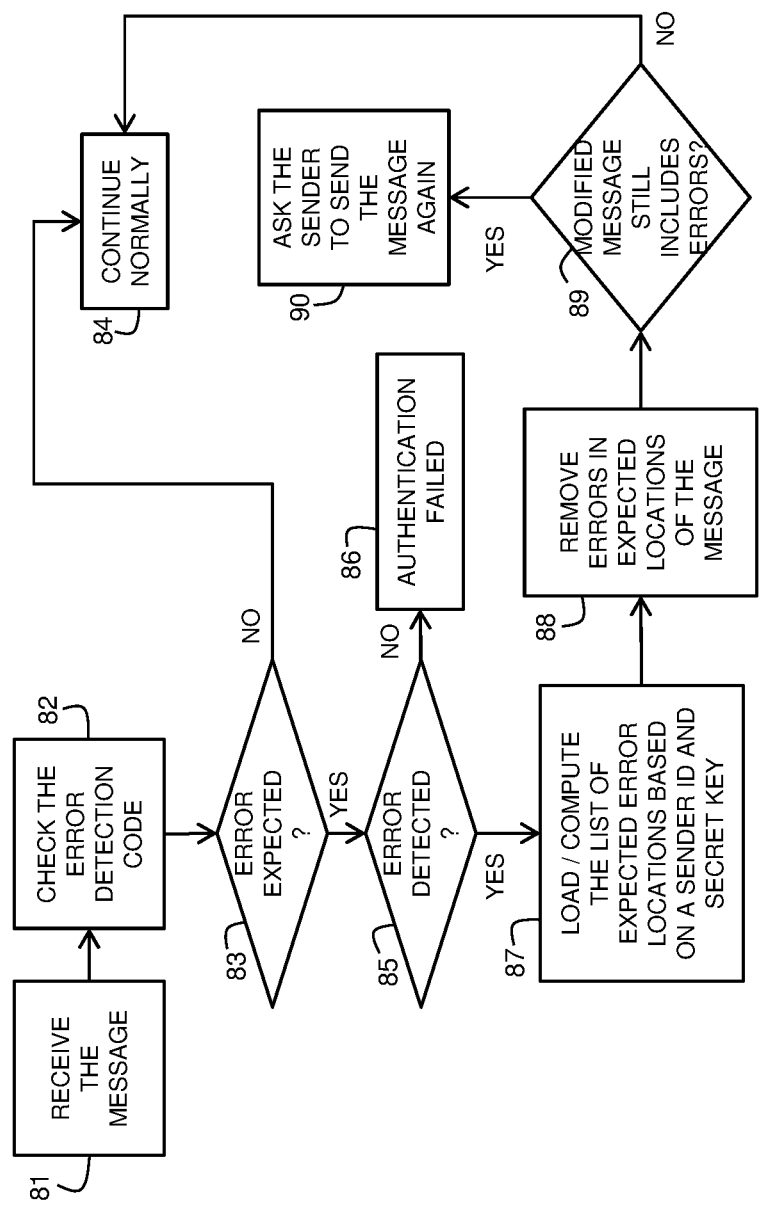
FIG. 6 illustrates a method for authenticating a message in a device with error detection code but without error correction code in accordance with an embodiment.

FIG. 6 illustrates method 80 for authenticating a message in a device without error correction in accordance with an embodiment. Method 80 is similar to method 60 in FIG. 5 and can be used if a protocol uses an error detection code that provides error detection but not error correction. For example, many communication protocols use a cyclic redundancy check (CRC) checksum that provides error detection but not error correction. Method 80 begins at step 81. At step 81 a message is received from an authenticating device (e.g., a smartcard). The message may have been transmitted wirelessly (such as by NFC, Bluetooth, or Wifi) or with a wired protocol such as ethernet. The message will include intentional errors that were introduced by the authenticating device. A list of the intentional error locations, or a key and algorithm to generate the list, will already have been transmitted to the verifier device. At step 82 the verifier runs its EDC on the message. At decision step 83 if no errors are expected and the message does not include intentional errors, then the method follows the NO path to step 84 where processing of the message continues normally. If errors are expected, then the YES path is taken to decision step 85. At decision step 85 if no errors are detected, then the NO path is taken to step 86 where the authentication failed because the missing expected errors may indicate the message was sent by a clone device. If, at step 85, one or more errors are detected, the YES path is taken to step 87. At step 87 the precomputed list of expected intentional error locations is loaded or computed. In one embodiment, the list of error locations was generated by the authenticating device and previously sent to the verifier device as discussed above. In another embodiment, the list may be computed based on a predetermined function such as a hash function and a device ID from the sending device and/or a secret key shared between the two devices. In method 80, it is assumed that a bit field or region having a device ID does not include errors. Example methods for composing a message with intentional errors are described above and illustrated in FIG. 2 and FIG. 4. At step 88 the errors indicated by the list of intentional errors are removed from the message. In one embodiment, the bits at the locations indicated by the list of intentional error locations are inverted (see Table 1 and FIG. 3 for an example list of error locations). At decision step 89, it is determined if the message still includes errors. This may be determined by running EDC on the message again. If no errors are detected, then the message may be from a genuine device and the NO path is taken to step 84 where processing continues normally. If errors are still detected in the message, then the verifier device requests the message be resent.

In another embodiment, another method for authenticating a device without ECC can be used. For example, the message that incorporates deliberate errors from a shared list of error locations may be sent twice. The first time the message is sent the authenticating device sends it with deliberately incorporated errors. The verifier device detects that errors are present and will save the message in its memory while asking the authenticating device to send the message a second time. The authenticating device will send the message the second time without intentional errors. The verifier device will then compare the second message sent without intentional errors with the first message sent with intentional errors. All differences between the first and second versions of the message will give the verifier device the error locations in the first message. The rest of the protocol can be followed as shown in FIG. 5 where ECC is used.

In another embodiment, a different mechanism can be used with the error detection codes (when no error correction is available). When the verifier gets the message with intentional errors, it can re-introduce errors in the already known locations (invert the bits at the known locations where the errors are supposed to be) and run the error detection check. If a genuine device sent the message and introduced the errors, then the bit inversions made by the verifier device will correct all errors and thus the error detection will not detect any errors. If other errors occurred during the transmission or if a counterfeit or clone device sent the message, then there will be errors detected and thus the verifier will not proceed with the message handling (in many protocols the verifier will wait for a new message from the device or it will send a response "error, send the message again"). Several methods for authenticating a device have been shown and additional methods are possible. The method used may be determined depending on the final application and use case.

Many authentication protocols have multiple rounds. In such protocols the verifier checks the identity of the authenticating device multiple times to increase the probability that the device is genuine, i.e., decrease the probability of a successful attack or cloning. The described methods can be applied in every round of such authentication scheme thus also decreasing the chance that the authentication succeeds by random chance. More generally, a method according to the described embodiments can be inserted in each message of any protocol that has multiple messages going back and forth between 2 devices.

The described methods can be used continuously during the entire communication session between two devices. In other words, every message that is sent by one device can have deliberately introduced errors. This can increase the probably that the other device is genuine and not a clone.

Figure 7:
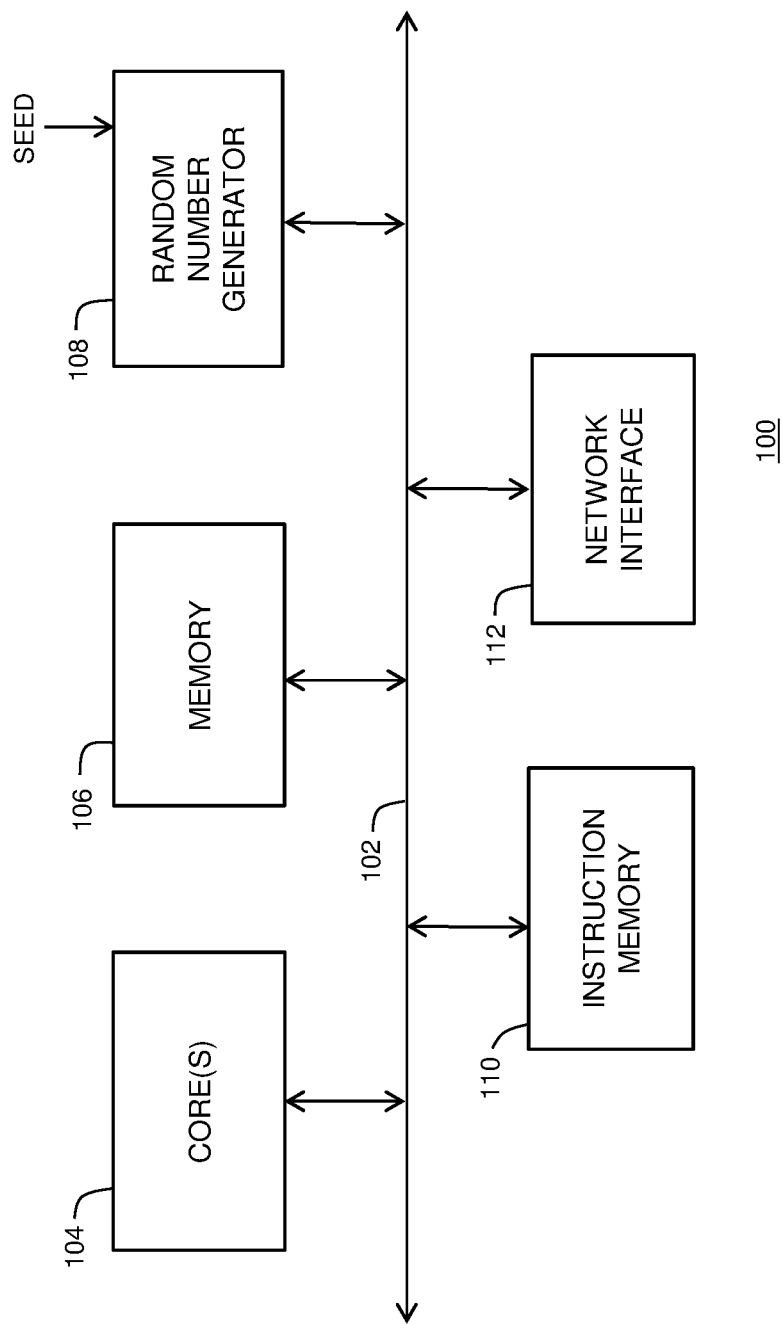
FIG. 7 illustrates a data processor suitable for use in the method in accordance with an embodiment.

FIG. 7 illustrates a data processing system 100 suitable for use in the authentication methods in accordance with an embodiment. Data processing system 100 may be implemented on one or more integrated circuits and may be used in an implementation of the described embodiments of the authenticating device and the verifier device. Data processing system 100 includes bus, or switch network 102. Various modules or circuits may be connected to bus 102. For example, connected to bus 102 in FIG. 7 are one or more processor cores 104, memory 106, random number generator 108, instruction memory 110, and network interface 112. The one or more processor cores 104 may include any hardware device capable of executing instructions stored in memory 106 or instruction memory 110. For example, processor cores 104 may execute the code used for EDC, ECC, and authentication. Processor cores 104 may be, for example, a microprocessor, field programmable gate array (FPGA), application-specific integrated circuit (ASIC), or similar device. Processor cores 104 may be implemented in a secure hardware element and may be tamper resistant.

Memory 106 may be any kind of memory, such as for example, L1, L2, or L3 cache or system memory. Memory 106 may include volatile memory such as static random-access memory (SRAM) or dynamic RAM (DRAM), or may include non-volatile memory such as flash memory, read only memory (ROM), or other volatile or non-volatile memory. Also, memory 106 may be implemented in a secure hardware element. Alternately, memory 106 may be a hard drive implemented externally to data processing system 100. In one embodiment, memory 106 is used to store software or data required for running a fault detector and the method for detecting a fault injection.

Random number generator 108 may be a conventional pseudo-random number generator configured to receive a seed value labeled "SEED" as described herein for creating a list of error locations.

Network interface 112 may include one or more circuits for enabling communication with other hardware devices. For example, network interface 112 may include, or be coupled to, a network interface card (NIC) configured to communicate according to the Ethernet protocol. Also, network interface 112 may implement a TCP/IP stack for communication according to the TCP/IP protocols. Communication between authenticating device and verifier device may be via network interface 112, or similar interface. Various other hardware or configurations for communicating are available.

Instruction memory 110 may include one or more machine-readable non-transient storage media for storing instructions for execution by processor cores 104. In other embodiments, both memories 106 and 110 may store data upon which processor cores 104 may operate. Memories 106 and 110 may store the list of error locations. Memories 106 and 110 may also store, for example, encryption, decryption, and verification applications. Memories 106 and 110 may be implemented in a secure hardware element and may be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for authenticating an electronic device, the method comprising:
    obtaining a message to be sent;
    determining a plurality of error locations for errors to be intentionally introduced into the message, wherein a bit is inverted at each of the error locations of the plurality of error locations in the message to generate a message with intentionally introduced errors, wherein if an error location is in a forbidden zone, discarding the error location;
    sending the plurality of error locations to a verifier device or enabling the verifier device to generate the plurality of error locations; and
    transmitting the message with the intentionally introduced errors to the verifier device, wherein the verifier device is enabled to use the plurality of error locations to authenticate the electronic device by comparing errors detected in the transmitted message to the plurality of error locations.

2. The method of claim 1, further comprising computing a checksum for the message using an error detecting code.

3. The method of claim 1, further comprising computing a checksum for the message using an error correcting code.

4. The method of claim 3, wherein the intentionally introduced errors are removed using the error correcting code.

5. The method of claim 1, wherein determining the plurality of error locations further comprises determining the plurality of error locations using a secret key as a seed for a pseudo-random number generator to randomly determine the plurality of error locations.

6. The method of claim 1, wherein the plurality of error locations is compiled into a list and stored in memory of the electronic device and the verifier device.

7. The method of claim 1, wherein the plurality of error locations is generated in the electronic device using a device identifier and a special function, and wherein the verifier device is enabled to generate the plurality of error locations using the device identifier and the special function.

8. The method of claim 1, wherein the plurality of error locations is changed every time the electronic device is authenticated.

9. The method of claim 1, wherein the electronic device is one of a smartcard, a CD, a DVD, or a printer cartridge.

10. A method for authenticating an electronic device by a verifier device, the method comprising:
receiving a message from the electronic device;
determining that the message includes errors;
extracting a list of error locations of a plurality of intentionally introduced errors, wherein if an error location is in a forbidden zone, discarding the error location;
inverting a bit in the message at each location of the list of error locations to produce a modified message;
detecting if the modified message includes errors, and determining if the detected errors match the list of error locations,
wherein the list of error locations and detected errors are used to authenticate the electronic device.

11. The method of claim 10, wherein determining that the message includes errors further comprises using an error detecting code (EDC) to determine that the message includes errors.

12. The method of claim 10, wherein extracting the list of locations further comprises generating the list of locations using a device identifier and a special function.

13. The method of claim 10, wherein extracting the list of error locations further comprises retrieving the list of error locations from a memory in the verifier device.

14. The method of claim 10, wherein the verifier device comprises one of a smartcard reader, a smart phone, a CD/DVD player, or a printer.

15. A method for authenticating an electronic device, the method comprising:
receiving a message from the electronic device in a verifier device;
checking the message for errors using error correction code (ECC);
detecting errors in the message;
attempting to correct the errors in the message using the ECC;
extracting a list of intentionally introduced error locations;
counting the errors that were corrected and were on the extracted list of intentionally introduced errors to produce an error count; and
determining that the electronic device is genuine if the error count is above a predetermined threshold.

16. The method of claim 15, wherein the ECC includes one or more of a Hamming code, extended Hamming code, or Reed-Solomon code.

17. The method of claim 15, further comprising receiving the extracted list of intentionally introduced error locations by the verifier device from the electronic device.

18. The method of claim 17, wherein the list of intentionally introduced error locations is recreated in the verifier device using a device identifier and a special function.

19. The method of claim 17, wherein the list of intentionally introduced error locations is retrieved from a memory in the verifier device.

* * * * *